United States Patent [19]

Kay et al.

[11] Patent Number: 4,705,568

[45] Date of Patent: Nov. 10, 1987

[54] COMPOSITIONS INCORPORATING TITANIUM COMPOUNDS

[75] Inventors: Peter D. Kay, Hartlepool; Michael C. Girot, Stockton on Tees, both of England

[73] Assignee: Tioxide Group PLC, London, England

[21] Appl. No.: 754,293

[22] Filed: Jul. 12, 1985

[30] Foreign Application Priority Data

Jul. 20, 1984 [GB] United Kingdom ................. 8418518

[51] Int. Cl.$^4$ ............................................. C09D 11/14
[52] U.S. Cl. ...................................... 106/26; 106/20; 106/22; 106/23
[58] Field of Search ...................... 106/20, 299, 26, 22, 106/23; 523/161, 160; 260/DIG. 38

[56] References Cited

U.S. PATENT DOCUMENTS 4,305,847 12/1981 Stoetzer et al. .................... 106/1.13

FOREIGN PATENT DOCUMENTS 1525418 9/1978 United Kingdom .
2123432 2/1984 United Kingdom .

*Primary Examiner*—Amelia Burgess Yarbrough
*Attorney, Agent, or Firm*—Banner, Birch, McKie and Beckett

[57] ABSTRACT

In has been desired to employ adhesion promoters in printing inks to promote the adhesion of the ink to a plastic substrate but hitherto the available adhesion promoters have tended to discolor the ink and in certain cases to produce an ink containing a somewhat objectionable odor.

A new printing ink has been developed which is based on a polymeric binder, a solvent therefor and an adhesion promoting agent which is the reaction product of a titanium orthoester and either a monoalkyl phosphate or a dialkyl phosphate or a mixture thereof in such proportions that the molar ratio of titanium to phosphate expressed as Ti:P is from 4:1 to 1:2.

16 Claims, No Drawings

COMPOSITIONS INCORPORATING TITANIUM COMPOUNDS

This invention relates to compositions and particularly to compositions incorporating titanium compounds, preferably printing inks.

According to the present invention a printing ink comprises a polymeric binder, a solvent therefor and an adhesion promoting agent comprising the reaction product of a titanium orthoester and either a monoalkyl phosphate or a dialkyl phosphate or a mixture thereof in such proportions that the molar ratio of titanium to phosphate expressed as Ti:P is from 4:1 to 1:2.

Preferably the ink includes a reaction product in which the molar ratio Ti:P is 2:1 to 1:1.5.

It will be seen that the printing inks of the present invention basically include as an essential ingredient the reaction product of the titanium orthoester and of either a monoalkyl phosphate or dialkyl phosphate or their mixture in proportions such as described previously to provide the necessary and desirable molar ratio of Ti:P. Generally speaking the titanium orthoester from which the reaction product is provided has the general formula $Ti(OR)_4$ in which R represents an alkyl group which usually contains up to 8 carbon atoms. However preferably the alkyl group contains fewer carbon atoms than eight and it has been found that the most preferred compounds are based on alkyl groups containing 3 or 4 carbon atoms. It is of course possible that mixed alkyl orthotitanates may be used such as mixed isopropyl butyl titanate.

Generally speaking the monoalkyl phosphate used to prepare the particular reaction product will have the general formula $(R_1O)PO(OH)_2$ and the dialkyl phosphate will have the general formula $(R_2O)(R_3O)PO(OH)$. In these two formulae $R_1$, $R_2$ and $R_3$ each represents an alkyl group which can contain up to 10 carbon atoms but preferably contains no more than 5 carbon atoms. Preferably also $R_1$, $R_2$ and $R_3$ are identical when mixed monoalkyl and dialkyl phosphates are to be used but this need not necessarily be so. Naturally if desired the dialkyl phosphate can include different alkyl groups.

The reaction product comprising the adhesion promoting agent is prepared by mixing of the respective reactants in any order and, if desired, in the presence of a suitable solvent which if allowed to remain in the reaction mixture should be compatible with the ink into which the agent is to be mixed. Such solvents which have been found to be useful are alcohols such as isopropyl alcohol, butyl alcohol or industrial methylated spirits. Generally the reaction is carried out at room temperature with stirring and cooling, if necessary.

As indicated previously the use of the reaction product of the titanium orthoester is of value in printing inks and not only have these products been found to act as adhesion promoters but they have a reduced tendency to discolor the ink and the ink is heat stable. The inks are odor free when compared with some existing printing ink compositions.

The inks of the present invention which are of particular interest are the flexographic and gravure inks in which the polymeric binder is cross-linkable and is dissolved in an appropriate organic solvent therefor and typical binders used in such inks are those based on nitrocellulose or ester type modified cellulose, e.g cellulose acetate propionate. Often such polymeric binders are employed in mixed form with polyamides, polyurethanes or other resins.

The ink also usually contains one or more pigments and or one or more dyes and typical pigments which can be used are the colored inorganic pigments, white inorganic pigments and colored organic pigments. Organic dyes can be used to render the ink an appropriate color and often are used in conjunction with an opacifying white inorganic pigment such as titanium dioxide. It will be seen however that the printing ink of the present invention need not necessarily include a pigment and/or a dye.

The inks of the present invention usually contain the reaction product of the titanium orthoester in an amount of up to 10% by weight of the total weight of ink and preferably in an amount of 1 to 6% by weight of the ink.

The inks of the present invention can contain other additives such as slip aids and plasticisers.

The inks of the present invention are of particular use in printing substrates formed of polyethylene or co-extruded polypropylene/polyethylene film or sheets where adhesion of the ink to the substrate is particularly important. Other films such as polyvinylidene dichloride coated plastics material in which the use of the reaction products of the titanium orthoester in accordance with the present invention have been found to be beneficial in conferring heat stability in particular on the ink.

The dissolution of a dialkyl pyrophosphate in an alcohol produces a mixture of a monoalkyl phosphate and a dialkyl phosphate. Accordingly the reaction product of the titanium orthoester and mixed monoalkyl and dialkyl phosphate can be produced by reacting a solution of a dialkyl pyrophosphate in an alcohol with the titanium orthoester.

The invention is illustrated in the following Examples:

EXAMPLE 1

To a round bottomed flask equipped with a stirrer, condenser and dropping funnel and containing 284 gms of tetraisopropyl titanate there was slowly added from the funnel 203 gms of a commercial mixture of approximately equi-molar proportions of monoamyl phosphate and diamyl phosphate. The contents were stirred with the flask in a cooling bath until the addition was complete.

An ink was made from the following ingredients in a ball mill

|  | parts by weight |
| --- | --- |
| Nitrocellulose (Dry wt) | 5.05 |
| Polyurethane resin | 6.72 |
| Rutile $TiO_2$ | 15.54 |
| Dicyclohexyl phthalate | 5.46 |
| Polyethylene wax | 2.00 |
| Isopropanol | 2.16 |
| Industrial methylated spirits | 22.02 |
| Ethyl acetate | 26.17 |
| Toluene | 14.88 |
|  | 100.00 |

The 100 parts by weight of the above ink there was added 1 part by weight of the reaction product by weight of the prepared reaction product. The so prepared ink was used to prepare and test a printed strip of co-extruded polythylene/polypropylene and for comparison the ink without added reaction product was used to print an adjacent area of the strip. A sticky tape, (7.6 cm wide) was applied to the printed strip to contact both ink surfaces and pressure applied to ensure good contact.

The tape was then quickly removed from both inks simultaneously and a visual inspection made of the strip. It was apparent that little or no ink containing the titanate was removed whereas virtually all the unmodified ink was removed by the sticky tape.

Samples of co-extrudate printed with both inks were mounted between sheets of aluminium foil and heated to approximately 160° C. for 10 seconds. The heated samples were allowed to cool and the foil removed and inspected. It was clear that less of the modified ink had become transferred to the foil than that of the unmodified ink.

EXAMPLE 2

A titanate was prepared in a manner similar to that described in Example 1 from 340 gms of tetra-n-butyl titanate and 182 gms of an approximately equi-molar mix of monobutyl phosphate and dibutyl phosphate.

The titanate was used to prepare an ink in a similar manner to that of Example 1 and tested similarly.

Again the modified ink exhibited improved adhesion and heat resisting properties.

EXAMPLE 3

A titanate was prepared in apparatus as described in Example 1 from 340 gms of tetra-n-butyl titanate and 154 gms of monobutyl phosphate dissolved in 308 gms industrial methylated spirits with vigorous stirring.

The titanate solution was used to prepare an ink similar to that of Example 1 except that 1.5 parts by weight of the solution was added and tested similarly.

The modified ink was shown to have similar improved properties to those of Examples 1 and 2.

EXAMPLE 4

A titanate was prepared using the apparatus of Example 1 from 340 gms of tetra-n-butyl titanate and 210 gms of dibutyl phosphate.

An ink was prepared similar to that of Example 1 using the titanate and tested similarly.

Once more the modified ink exhibited superior adhesion and heat resistance compared with an unmodified ink.

It was seen that the inks of all the previous Examples did not discolor on the addition of the titanate or upon storage thereafter.

EXAMPLE 5

A titanate was prepared in apparatus as described in Example 1 from 284 gms of tetraisopropyl titanate and 161 gms of an approximately equi-molar mix of a monoisopropyl phosphate and diisopropyl phosphate dissolved in 94 gms of industrial methylated spirits with vigorous stirring.

The titanate was used to prepare an ink in a manner similar to that of Example 1 and tested similarly.

The modified ink was shown to have similar properties to those of the modified inks of Examples 1, 2, 3 and 4.

EXAMPLE 6

A solution of mixed mono and dialkyl phosphates was prepared by reacting 145 gms of butyl pyrophosphate with 54 gms of industrial methylated spirits.

A titanate was prepared in apparatus similar to that described in Example 1 by adding the above solution to 340 gms of tetra-n-butyl titanate with vigorous stirring.

The titanate was used to prepare an ink in a manner similar to that of Example 1 and tested similarly. The modified ink exhibited improved properties similar to the modified ink of Examples 1, 2, 3, 4 and 5.

What is claimed is:

1. An ink for marking a plastic substrate, the ink containing an adhesion promoting agent which comprises the reaction product of a titanium orthoester and a compound selected from the group consisting of monoalkyl phosphates, dialkyl phosphates and mixtures thereof wherein said reaction product has a molar ratio of titanium to phosphate expressed as Ti:P of from 4:1 to 1:2.

2. The ink of claim 1, wherein said Ti:P ratio is from 2:1 to 1:1.5.

3. The ink of claim 1, wherein the titanium orthoester has the general formula Ti(OR)$_4$ in which R represents an alkyl group containing up to 8 carbon atoms.

4. The ink of claim 3, wherein R represents an alkyl group containing 3 or 4 carbon atoms.

5. The ink of claim 1, wherein the monoalkyl phosphate has the general formula (R$_1$O)PO(OH)$_2$ and the dialkyl phosphate has the general formula (R$_2$O)(R$_3$O)PO(OH) in which R$_1$, R$_2$ and R$_3$ each represents an alkyl group containing up to 10 carbon atoms.

6. The ink of claim 5, wherein R$_1$, R$_2$ and R$_3$ each represent an alkyl group containing up to 5 carbon atoms.

7. The ink of claim 5, wherein R$_1$, R$_2$ and R$_3$ represent identical alkyl groups.

8. The ink of claim 1, wherein the ink also contains a polymeric binder based on nitrocellulose.

9. The ink of claim 1, wherein the ink also contains a polymeric binder based on modified cellulose.

10. The printing ink of claim 1, wherein the ink also contains a pigment.

11. The printing ink of claim 1, wherein the ink contains up to 10% by weight of said reaction product.

12. The printing ink of claim 11, wherein the ink contains from 1% to 6% by weight of the reaction product.

13. A method of making an ink which is adherable to a plastic substrate which comprises mixing the ink with an adhesion promoting agent, the adhesion promoting agent comprising the reaction product of a titanium orthoester and a compound selected from the group consisting of monoalkyl phosphates, dialkyl phosphates and mixtures thereof wherein said reaction product has a molar ratio of titanium to phosphate expressed as Ti:P of from 4:1 to 1:2.

14. The ink of claim 1, wherein the ink also contains a dye.

15. The ink of claim 1, wherein the ink also contains a dye and a pigment.

16. A method of improving adhesion between an ink and a plastic substrate to which the ink is applied, comprising adding to the ink the reaction product of a titanium orthoester and a compound selected from the group consisting of monoalkyl phosphates, dialkyl phosphates and mixtures thereof, wherein the reaction product has a molar ratio of titanium to phosphate of from 4:1 to 1:2.

* * * * *